United States Patent
Cheng et al.

(10) Patent No.: US 11,181,679 B2
(45) Date of Patent: Nov. 23, 2021

(54) FRONT LIGHT MODULE AND DISPLAY DEVICE

(71) Applicant: E Ink Holdings Inc., Hsinchu (TW)

(72) Inventors: Chao-Chun Cheng, Hsinchu (TW); Sheng-Chieh Tai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/068,841

(22) Filed: Oct. 13, 2020

(65) Prior Publication Data

US 2021/0116624 A1    Apr. 22, 2021

(30) Foreign Application Priority Data

Oct. 21, 2019    (TW) .................................. 108137933

(51) Int. Cl.
*G02B 6/42* (2006.01)
*G02F 1/13357* (2006.01)
*F21V 8/00* (2006.01)

(52) U.S. Cl.
CPC ......... *G02B 6/0031* (2013.01); *G02B 6/0066* (2013.01)

(58) Field of Classification Search
CPC .. G02B 6/0013; G02B 6/0023; G02B 6/0016; G02B 6/0066; G02F 1/133314
See application file for complete search history.

(56) References Cited

U.S. PATENT DOCUMENTS

| | | | |
|---|---|---|---|
| 8,061,882 B2 | 11/2011 | Bita et al. | |
| 8,639,072 B2 | 1/2014 | Popovich et al. | |
| 9,983,455 B2 | 5/2018 | Gupta et al. | |
| 10,094,739 B2 | 10/2018 | Hayashi | |
| 2009/0224245 A1* | 9/2009 | Umezaki | H01L 29/78663 257/59 |
| 2014/0340933 A1* | 11/2014 | Lin | G02B 6/0028 362/610 |
| 2017/0102497 A1 | 4/2017 | Pao | |
| 2017/0108720 A1 | 4/2017 | Tsai et al. | |
| 2018/0172894 A1* | 6/2018 | Sohn | G02B 6/0055 |
| 2019/0302348 A1 | 10/2019 | Tai et al. | |

FOREIGN PATENT DOCUMENTS

| | | | |
|---|---|---|---|
| EP | 3330605 A1 * | 6/2018 | .......... G02B 6/0026 |
| TW | 201437702 A | 10/2014 | |
| TW | 201502609 A | 1/2015 | |
| TW | 201835654 A | 10/2018 | |
| TW | 201908834 A | 3/2019 | |

OTHER PUBLICATIONS

Corresponding Taiwan office action dated May 22, 2020.

* cited by examiner

*Primary Examiner* — Karabi Guharay
(74) *Attorney, Agent, or Firm* — CKC & Partners Co., LLC

(57) ABSTRACT

A front light module includes a light guide plate, a light source and a light guide medium. The light guide plate includes a top surface, a bottom surface opposite to the top surface and a light incident surface adjoining the top surface and the bottom surface. The light source is disposed beside the light incident surface. A top surface of the light source and the top surface of the light guide plate have a first step therebetween. The light guide medium is between the light source and the light incident surface of the light guide plate.

18 Claims, 4 Drawing Sheets

FRONT LIGHT MODULE AND DISPLAY DEVICE

CROSS-REFERENCE TO RELATED APPLICATION

This application claims priority to Taiwan Application Ser. No. 108137933, filed Oct. 21, 2019, which is herein incorporated by reference in its entirety.

BACKGROUND

Field of Invention

The present invention relates to a front light module and a display device.

Description of Related Art

A reflective display device has various applications. For example, it can be applied to outdoor fields, such as road lighting, large outdoor billboards, traffic lights and related fields. The reflective display device includes a light guide plate, a display panel, and a light source module. To obtain good display uniformity, a size of the light guide plate should be greater than a size of the display panel. An optical auxiliary is attached on a blank region on the light guide plate to reduce the light or provide reflection so as to provide better display image. The reflective display device further includes a case to protect a light source module. However, the case should enclose the light source module such that the case and the light guide plate are not at the same horizontal plane. As a result, the reflective display device can not realize an entire flat surface design.

SUMMARY

The embodiment of the disclosure provides a front light module providing a surface light source with an entire flat surface.

The front light module of the disclosure includes a light guide plate, a light source and a light guide medium. The light guide plate includes a top surface, a bottom surface and a light incident surface. The bottom surface is arranged opposite to the top surface. The light incident surface adjoins the top surface and the bottom surface. The light source is disposed beside the light incident surface. A top surface of the light source and the top surface of the light guide plate have a first step therebetween. The light guide medium is between the light source and the light incident surface of the light guide plate.

In one embodiment of the present disclosure, the front light module further includes a case. The case has a bottom plate and an extension portion on an edge of the bottom plate. The light source is over the bottom plate. A top surface of the extension portion is substantially level with the top surface of the light guide plate.

In one embodiment of the present disclosure, the extension portion abuts against the light incident surface of the light guide plate.

In one embodiment of the present disclosure, the front light module further includes a glue layer. The glue layer adheres to the light guide medium and the light incident surface of the light guide plate. A refractive index of the glue layer is in a range from 1.4 to 1.6.

In one embodiment of the present disclosure, a top surface of the light guide medium and the top surface of the light guide plate have a second step therebetween.

In one embodiment of the present disclosure, a surface of the light guide medium includes a plurality of microstructures.

In one embodiment of the present disclosure, a material of the light guide plate includes glass.

In one embodiment of the present disclosure, the light guide plate has a plurality of microstructures, and the microstructures are on the top surface of the light guide plate.

The embodiment of the disclosure provides a display device having a display surface with an entire flat surface. Therefore, it has a good display effect.

The display device of the present disclosure includes a light guide plate, a light source, a light guide medium and a reflective display panel. The light guide plate includes a top surface, a bottom surface and a light incident surface. The bottom surface is arranged opposite to the top surface. The light incident surface adjoins the top surface and the bottom surface. The light source is disposed beside the light incident surface. A top surface of the light source and a top surface of the light guide plate have a first step therebetween. The light guide medium is between the light source and the light incident surface of the light guide plate. The reflective display panel is on the bottom surface of the light guide plate.

In one embodiment of the present disclosure, the display device further includes a case. The case has a bottom plate and an extension portion on an edge of the bottom plate. The light source is over the bottom plate. A top surface of the extension portion is substantially level with the top surface of the light guide plate.

In one embodiment of the present disclosure, the extension portion abuts against the light incident surface of the light guide plate.

In one embodiment of the present disclosure, the display device further includes a glue layer. The glue layer adheres to the light guide medium and the light incident surface of the light guide plate. A refractive index of the glue layer is in a range from 1.4 to 1.6.

In one embodiment of the present disclosure, a top surface of the light guide medium and the top surface of the light guide plate have a second step therebetween.

In one embodiment of the present disclosure, the display device further includes a glue layer. The glue layer adheres to the reflective display panel and the bottom surface of the light guide plate. A refractive index of the glue layer is in a range from 1.3 to 1.5.

In one embodiment of the present disclosure, the reflective display panel is between the bottom plate and the glue layer.

In one embodiment of the present disclosure, a material of the light guide plate includes glass.

In one embodiment of the present disclosure, the light guide medium includes a plurality of microstructures.

In one embodiment of the present disclosure, the display device of further includes at least one sensor. The sensor is between the reflective display panel and the bottom plate.

Based on the above, the top surface of the light source and the top surface of the light guide plate have the first step therebetween. Therefore, an enough space can be provided for disposing the case. In addition, the top surface of the extension portion of the case is substantially level with the top surface of the light guide plate. Therefore, the front light module can provide the surface light source with an entire flat surface. And the display surface of the display device has an entire flat surface. Therefore, it has a good display effect.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
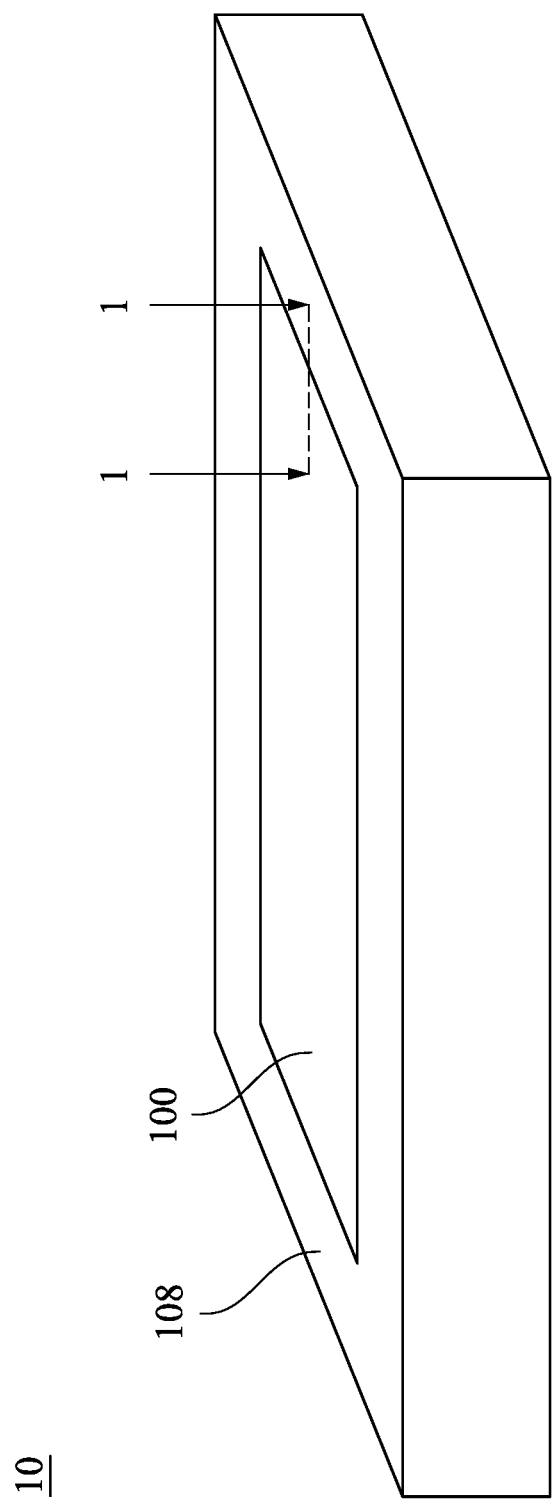
FIG. 1 is a perspective view of a front light module in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
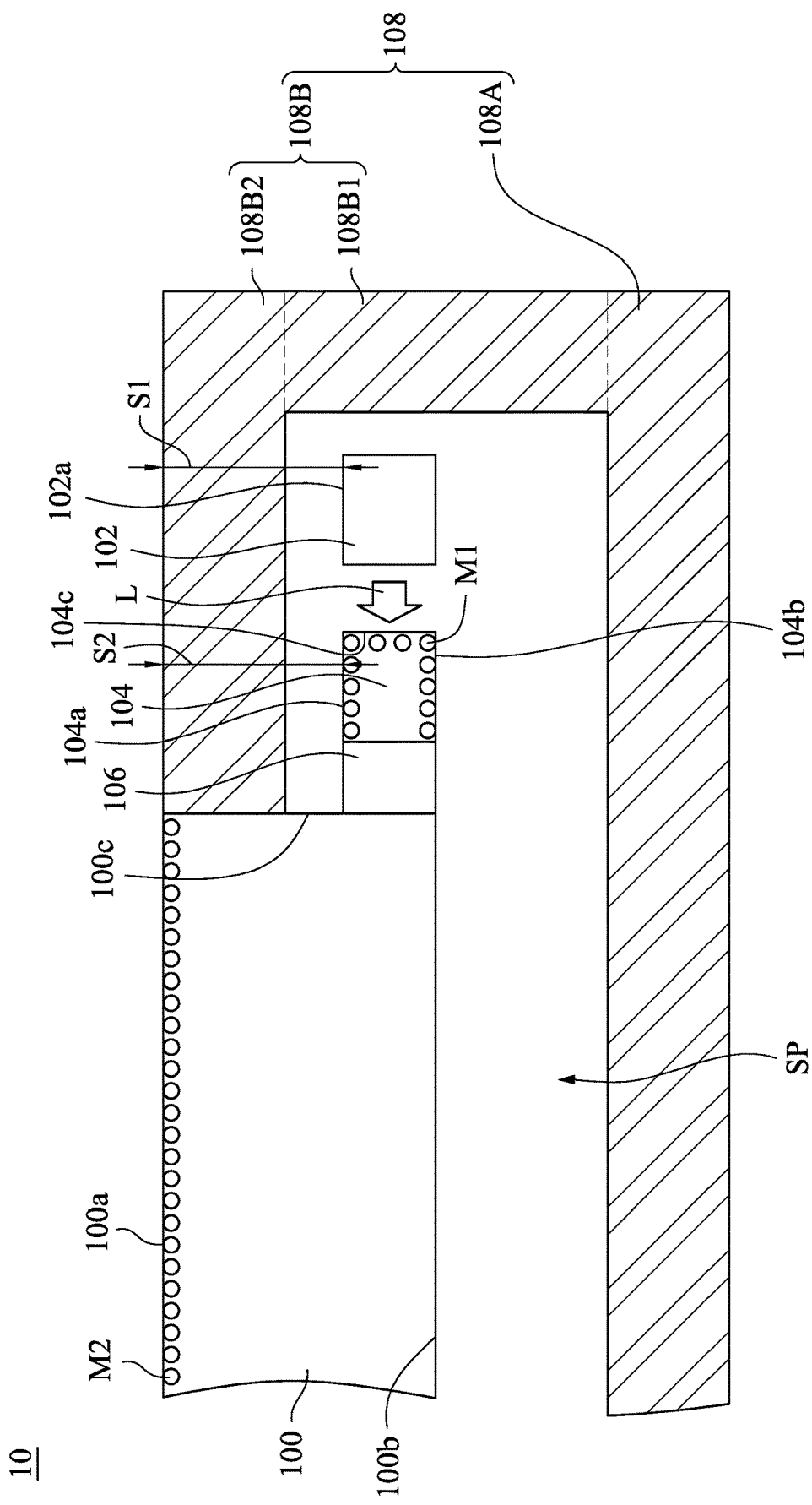
FIG. 2 is a cross-sectional view of the front light module of FIG. 1 cut along line 1-1.

FIG. 1 is a perspective view of a front light module 10 in accordance with one embodiment of the present disclosure. FIG. 2 is a cross-sectional view of the front light module 10 of FIG. 1 cut along line 1-1. Reference is made to FIGS. 1 and 2. The front light module 10 includes a light guide plate 100, a light source 102 and a light guide medium 104. In the present embodiment, the light source 102 includes a light bar composed of a plurality of light emitting diodes (LED) and is suitable for providing a light beam L. The light emitting diodes are electrically connected in series and parallel. In other embodiments, the light source 102 can be a light bar of other types of light emitting devices.

In particular, the light guide plate 100 includes a top surface 100a, a bottom surface 100b and a light incident surface 100c. The bottom surface 100b is arranged opposite to the top surface 100a. The light incident surface 100c adjoins the top surface 100a and the bottom surface 100b. The light source 102 is arranged beside the light incident surface 100c such that the light beam L provided by the light source 102 is incident to the light guide plate 100 through the light incident surface 100c. Therefore, a side-light type front light module is formed. The light guide medium 104 is between the light source 102 and the light incident surface 100c. The surface of the light guide medium 104 (e.g., the top surface 104a, the bottom surface 104b and/or the side surface 104c) includes a plurality of microstructures M1 (e.g., dots or v-shaped trench). After the light beam L from the light source 102 incident into the light guide medium 104, the microstructures M1 transmit the light beam L in a direction toward the light guide plate 100. In the present embodiment, the light incident surface 100c of the light guide plate 100 is, but is not limited to, substantially perpendicular to the top surface 100a and the bottom surface 100b.

The front light module 10 further includes a glue layer 106. The glue layer 106 adheres to the light guide medium 104 and the light incident surface 100c of the light guide plate 100 so as to fix the light guide medium 104 to the light incident surface 100c. A refractive index of the glue layer 106 is in a range from 1.4 to 1.6 such that a refractive index of the light guide plate 100 matches a refractive index of the light guide medium 104 to facilitate the transmission of the light beam L to the light incident surface 100c of the light guide plate 100. The glue layer 106 may be an optical clear resin (OCR) or optical clear adhesive (OCA). The glue layer 106 is coated between the light guide medium 104 and the light incident surface 100c of the light guide plate 100 and is cured by a curing process. In the present embodiment, the light guide medium 104 may be a glass, such as barium crown glass, low iron glass (ultra clear glass), aluminosilicate glass, borosilicate glass or plastic materials, such as polymethylmethacrylate (PMMA), polycarbonate (PC), methyl methacrylate-co-styrene (MS) or the like.

In the present embodiment, the light guide plate 100 may have a plurality of microstructures M2 on the top surface 100a. The microstructures M2 can destroy a total reflection of the light beam L inside the light guide plate 100 such that the light beam L can refract in a direction toward the underlying display panel (not shown). For example, the microstructures M2 may be formed by a surface treating on the top surface 100a of the light guide plate 100 such that the top surface 100a is roughened. The surface treating includes, but is not limited to, anti-glare coating, spray etching, or other suitable etching methods.

In the present embodiment, the front light module 10 includes a case 108. The case 108 has a bottom plate 108A and an extension portion 108B on an edge of the bottom plate 108A. The extension portion 108B surrounds the light guide plate 100. The light source 102 is over the bottom plate 108A. The extension plate 108B has a supporting portion 108B1 and a shielding portion 108B2 perpendicular to each other. The supporting portion 108B1 is on the bottom plate 108A. The light source 102 is between the supporting portion 108B1 and the light incident surface 100c of the light guide plate 100. The shielding portion 108B2 covers the light source 102. Therefore, the case 108 has a function of protecting and fixing the light source 102. In one embodiment, the case 108 is formed of a light refractive material. Therefore, a portion of the light which is incident to the case 108 can be reflected back to the light incident surface 100c of the light guide plate 100, thereby increasing an amount of incident light of the light incident surface 100c of the light guide plate 100 is increased. Therefore, a brightness of the front light module 10 is enhanced. For example, the case 108 may include metal or alloy.

The top surface 102a of the light source 102 and the top surface 100a of the light guide plate 100 have a first step S1 therebetween. The top surface 104a of the light guide medium 104 and the top surface 100a of the light guide plate 100 have a second step S2 therebetween. Therefore, an enough space can be provided for disposing an auxiliary material (e.g., the case 108) which is light reflective or provides protection. Therefore, a top surface of the extension portion 108B of the case 108 is substantially level with the top surface 100a of the light guide plate 100 to provide increased aesthetic. In the present embodiment, the extension portion 108B can abut against the light incident surface 100c of the light guide plate 100. The case 108 and the light guide plate 100 form a receiving space SP to provide a space for disposing the reflective display panel 112 (see FIG. 4), which will be described below. In this way, the front light module 10 can provide a surface light source with an entire flat surface to provide a good display effect for the display panel.

In the present embodiment, a material of the light guide plate 100 includes glass, hence the light guide plate 100 has a good structural strength and a weather resistance. Therefore, the front light module 10 can be applied to outdoor light emitting apparatuses. The light guide plate 100 can both function as a light guide and a protective cover. Hence, there is no need for an additional protective cover disposed on the top surface 100a of the light guide plate 100. Therefore, the display surface can be an entire flat surface and thus can provide a good display effect. For example, the light guide plate 100 can include barium crown glass, low iron glass (ultra clear glass), aluminosilicate glass and/or borosilicate glass.

Figure 3:
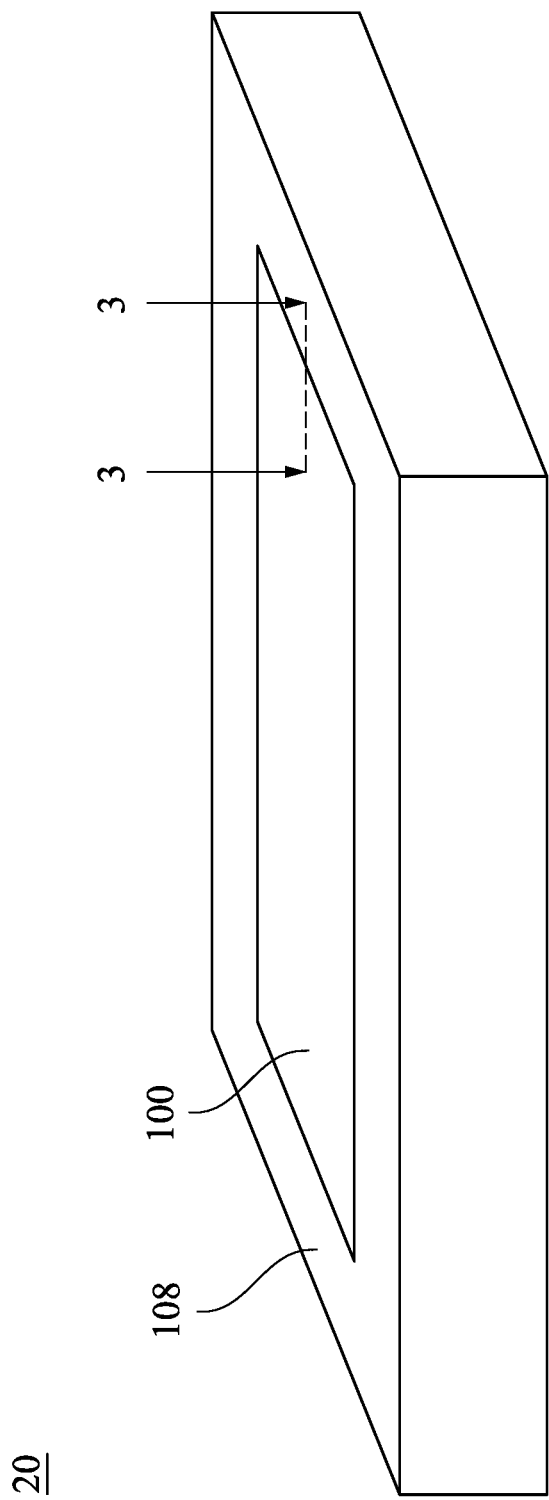
FIG. 3 is a perspective view of a display device in accordance with one embodiment of the present disclosure.
Figure 4:
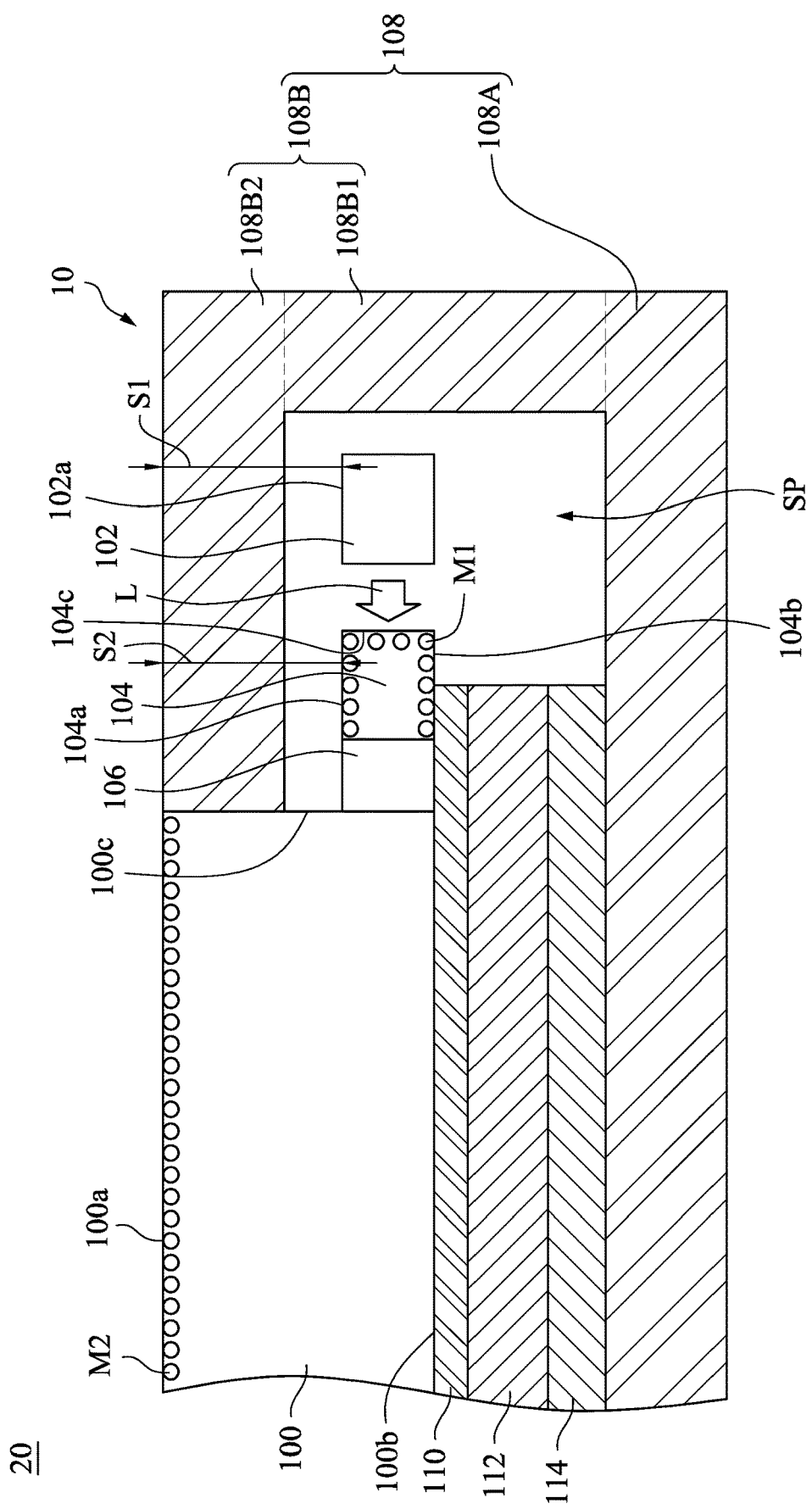
FIG. 4 is a cross-sectional view of the display device of FIG. 3 cut along line 3-3.

FIG. 3 is a perspective view of a display device 20 in accordance with one embodiment of the present disclosure. FIG. 4 is a cross-sectional view of the display device 20 of FIG. 3 cut along line 3-3. Reference is made to FIGS. 3 and 4. The display device 20 includes a light guide plate 100, a light source 102, a light guide medium 104, a glue layer 106, a case 108, and a reflective display panel 112. An arrangement of the light guide plate 100, the light source 102, the light guide medium 104, the glue layer 106 and the case 108 are the same as an arrangement of the front light module 10 of the embodiment of FIGS. 1 and 2, and the rest details thereof are not repeated herein. The display device 20 having the front light module 10 of the present disclosure has a surface light source with an entire flat surface such that a display image of the display device 20 is entire flat. Therefore, the display device 20 has a good display effect.

The reflective display panel 112 is on the bottom surface 100b of the light guide plate 100. The light beam L passes through the light guide plate 100 and refracts in a direction towards the reflective display panel 112. The display device 20 reflects the light from the light guide plate 100 by the reflective display panel 112 to a viewer, thereby displaying an image.

The reflective display panel 112 is inside the receiving space SP. In the present embodiment, the display device 20 further includes a glue layer 110. The glue layer 110 adheres to the reflective display panel 112 and the bottom surface 100b of the light guide plate 100 to fix the reflective display panel 112 and the light guide plate 100. In particular, the reflective display panel 112 is between the glue layer 110 and the bottom plate 108A. The bottom plate 108A can provide protection for the reflective display panel 112. For example, the glue layer 110 can be an optical clear resin (OCR) or an optical clear adhesive (OCA). The glue layer 110 is coated between the reflective display panel 112 and the bottom surface 100b of the light guide plate 100 and is cured by a curing process. In the present embodiment, the glue layer 110 includes a low refractive index material. In particular, a refractive index of the glue layer 110 is in a range from 1.3 to 1.5, thereby the light beam L can travel by total reflection in the light guide plate 100. A material of the reflective display panel 112 includes a glass fiber composite substrate or a glass material. The reflective display panel 112 can be a single piece reflective display panel or formed by splicing multiple reflective display panels.

In one embodiment, the display device 20 further includes at least one sensor 114. The sensor 114 is between the reflective display panel 112 and the bottom plate 108A. In one embodiment, the sensor 114 is a photo sensor such that the display device 20 can adjust the brightness of the display image in real time with an ambient light source sensed by the sensor 114. In one embodiment, the sensor 114 is a g-sensor to sense a rotation state of the display device 20, whether it is an upright state or a flat state. In one embodiment, a number of the sensors 114 is multiple.

Based on the above discussion, the top surface of the light source of the front light module and the top surface of the light guide plate of the embodiment of the present disclosure have the first step therebetween. The top surface of the light guide medium and the top surface of the light guide plate have the second step therebetween. Therefore, an enough space is provided for disposing the case. The top surface of the extension portion of the case is substantially level with the top surface of the light guide plate. Therefore, the front light module can provide the surface light source with the entire flat surface. In addition, the top surface of the light source of the display device and the top surface of the light guide plate of the embodiment of the present disclosure have the first step therebetween. The top surface of the light guide medium and the top surface of the light guide plate have the second step therebetween. Therefore, an enough space is provided for disposing the case. The top surface of the extension portion of the case is substantially level with the top surface of the light guide plate. Therefore, the display image of the display device has the entire flat surface and thus has a good display effect.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A front light module, comprising:
   a light guide plate, comprising:
      a top surface;
      a bottom surface arranged opposite to the top surface; and
      a light incident surface adjoining the top surface and the bottom surface;
   a light source disposed beside the light incident surface, wherein a top surface of the light source and the top surface of the light guide plate have a first step therebetween;
   a light guide medium between the light source and the light incident surface of the light guide plate; and
   a case having a bottom plate and an extension portion on an edge of the bottom plate, wherein the bottom plate is under the light guide plate, and the extension portion continuously extends from the edge of the bottom plate to be in contact with the light incident surface of the light guide plate.

2. The front light module of claim 1,
   wherein the light source is over the bottom plate, and a top surface of the extension portion is substantially level with the top surface of the light guide plate.

3. The front light module of claim 2, wherein the extension portion abuts against the light incident surface of the light guide plate.

4. The front light module of claim 1, further comprising:
   a glue layer adhering to the light guide medium and the light incident surface of the light guide plate, wherein a refractive index of the glue layer is in a range from 1.4 to 1.6.

5. The front light module of claim 1, wherein a top surface of the light guide medium and the top surface of the light guide plate have a second step therebetween.

6. The front light module of claim 1, wherein a surface of the light guide medium includes a plurality of microstructures.

7. The front light module of claim 1, wherein a material of the light guide plate includes glass.

8. The front light module of claim 1, wherein the light guide plate has a plurality of microstructures, and the microstructures are on the top surface of the light guide plate.

9. A display device, comprising:
a light guide plate, comprising:
a top surface;
a bottom surface arranged opposite to the top surface; and
a light incident surface adjoining the top surface and the bottom surface;
a light source disposed beside the light incident surface, wherein a top surface of the light source and a top surface of the light guide plate have a first step therebetween;
a light guide medium between the light source and the light incident surface of the light guide plate;
a reflective display panel on the bottom surface of the light guide plate; and
a case having a bottom plate and an extension portion on an edge of the bottom plate, wherein the bottom plate is under the light guide plate, and the extension portion continuously extends from the edge of the bottom plate to be in contact with the light incident surface of the light guide plate.

10. The display device of claim 9, wherein the light source is over the bottom plate, and a top surface of the extension portion is substantially level with the top surface of the light guide plate.

11. The display device of claim 10, further comprising:
a glue layer adhering to the reflective display panel and the bottom surface of the light guide plate, wherein a refractive index of the glue layer is in a range from 1.3 to 1.5.

12. The display device of claim 11, wherein the reflective display panel is between the bottom plate and the glue layer.

13. The display device of claim 10, further comprising:
at least one sensor between the reflective display panel and the bottom plate.

14. The display device of claim 9, wherein the extension portion abuts against the light incident surface of the light guide plate.

15. The display device of claim 9, further comprising:
a glue layer adhering to the light guide medium and the light incident surface of the light guide plate, wherein a refractive index of the glue layer is in a range from 1.4 to 1.6.

16. The display device of claim 9, wherein a top surface of the light guide medium and the top surface of the light guide plate have a second step therebetween.

17. The display device of claim 9, wherein a material of the light guide plate includes glass.

18. The display device of claim 9, wherein the light guide medium includes a plurality of microstructures.

* * * * *